N. B. BRALY.
CANVAS HOSE COUPLING.
APPLICATION FILED MAY 2, 1916.

1,228,397.

Patented June 5, 1917.

WITNESSES
Frederick Diehl.
A. L. Kitchin.

INVENTOR
N. B. Braly
BY
ATTORNEYS

UNITED STATES PATENT OFFICE.

NORMAN B. BRALY, OF BUTTE, MONTANA.

CANVAS-HOSE COUPLING.

1,228,397.

Specification of Letters Patent.

Patented June 5, 1917.

Application filed May 2, 1916. Serial No. 94,884.

*To all whom it may concern:*

Be it known that I, NORMAN B. BRALY, a citizen of the United States, and a resident of Butte, in the county of Silverbow and State of Montana, have invented a new and Improved Canvas-Hose Coupling, of which the following is a clear, full, and exact description.

This invention relates to coupling and particularly to an improved coupling for canvas hose and has for an object the provision of an improved arrangement which will properly hold the ends of sections together, but which at the same time will permit of quick disengagement.

Another object in view is to provide a coupling in which each section or part of the coupler is expansive.

A still further object in view is to provide a coupling formed by rings arranged in the ends of canvas hose, the rings being provided with overlapping parts slidingly connected together so that the rings may be expanded and contracted at will.

In the accompanying drawings:—

Referring to the accompanying drawings by numerals, 1 and 2 indicate the abutting or rather, overlapping ends of adjacent hose formed of canvas or other material having substantially the same characteristics. In mines it is usual to use canvas hose for ventilating the drifts under ground and it is desirable to provide a coupling which will operate properly at each section of hose. A construction embodying the present invention may operate at any point, there being one ring at each end of each section of hose, the rings being identical, whereby either end of any section may be instantly connected up with any other section.

Figure 1:
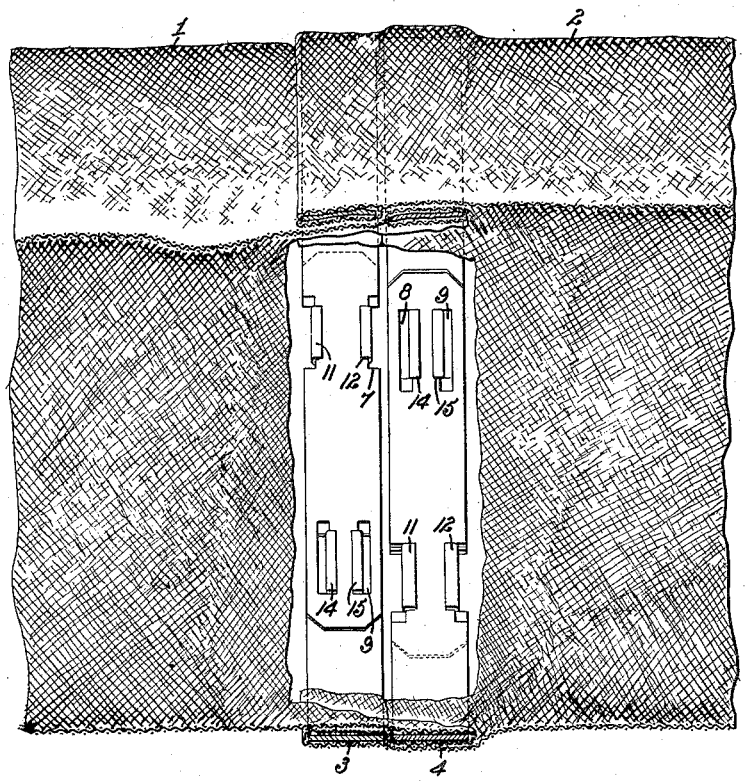
Figure 1 is a longitudinal vertical section through the ends of abutting hose, certain parts being shown in elevation and certain parts being broken away for illustrating concealed members.
Figure 2:
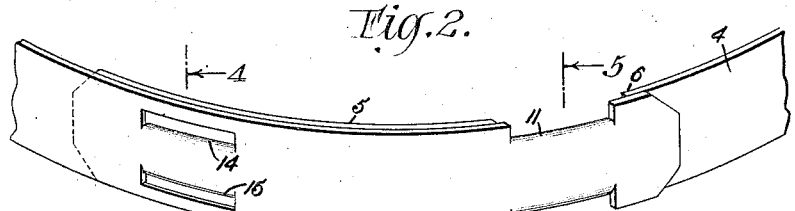
Fig. 2 is a detailed fragmentary perspective view of one of the coupling rings showing the overlapping ends.
Figure 4:
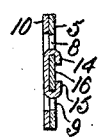
Fig. 4 is a section through Fig. 2 on line 4—4.
Figure 3:
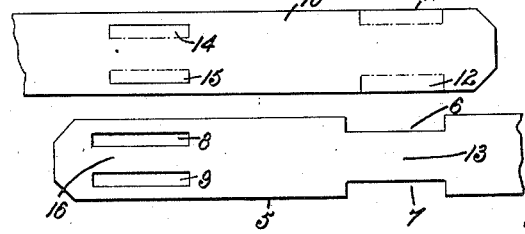
Fig. 3 is a plan view of the ends shown in Fig. 2 before the same are assembled, the parts being shown on a reduced scale.
Figure 5:
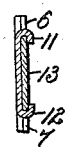
Fig. 5 is a section through Fig. 2 on line 5—5.

The extreme parts of the ends 1 and 2 are looped over and secured together by stitches so that the rings 3 and 4 are inclosed in these loops, there being a loop at each end of each section for inclosing the respective rings, rings 3 and 4 being identical in structure, but arranged in different hose sections. Preferably the rings are made from resilient metal and are formed so as to overlap, as shown particularly in Fig. 2. End 5 is provided with notches or cut away portions 6 and 7, as shown in Fig. 3, and with slots 8 and 9, said notches and slots being preferably of the same length. End 10 of ring 4 overlaps ring 5, as shown in Fig. 2 and is provided with turned over members 11 and 12 as shown more particularly in Fig. 5, said members overlapping the section 13 of end 5 which is positioned between notches 6 and 7. End 10 is also provided with turned over members 14 and 15 which overlap the section 16 between apertures 8 and 9, as shown more clearly in Fig. 4. The turned over members 11 and 12 and also the turned over members 14 and 15 are all preferably of the same length, said length, however, being an appreciable distance shorter than the length of the apertures 8 and 9 or the notches 6 and 7. The members 11 and 12 and also the members 14 and 15 do not tightly pinch the parts of end 5 coacting therewith, whereby the ends are slidingly fitted together thus admitting of an adjustment of the rings so as to produce a greater or less diameter, as occasion may demand. By forming the ring of resilient material the parts will remain in the position in which they are adjusted, especially when adjusted to an expanded position by reason of the friction between the overlapping parts. Rings 3 and 4 are of the same size so that when the same are arranged, as shown in Fig. 1, the sections 1 and 2 cannot be pulled apart. In operation after the rings have been properly secured to the respective sections of hose and it is desired to connect up certain sections one of the rings is contracted and passed through the other ring and then turned and allowed or forced to expand, so that the parts will assume the position shown in Fig. 1. As the rings are of the same size the sections cannot be accidentally disconnected.

What I claim is:—

1. In a coupling of the character described, a pair of canvas hose sections with rings arranged in each section, each of said rings being of the same size and formed with overlapping portions provided with pressed-out members for limiting lateral movement and also longitudinal movement of the overlapping sections.

2. In a coupling of the character described a ring formed of resilient material having overlapping ends, one of said ends having an elongated aperture therein and an elongated notch spaced from said aperture, and the other said ends having a pair of turned over members, one of said turned over members extending through said aperture and the other said turned over members fitting into said notch, said turned over members being of a less length than the aperture and notch whereby a sliding movement is permitted between said ends for increasing or decreasing the diameter of the ring.

3. In a coupling for canvas hose, a ring for each end of each section, each of said rings being formed from resilient material having overlapping ends, one of said ends having a pair of parallel apertures and a pair of parallel notches spaced from the apertures, the other of said ends having a pair of turned over interlocking members extending through said apertures, said interlocking members being of less length than said apertures, said last mentioned end being also provided with a pair of turned over interlocking members extending through said notches, said last mentioned interlocking members being of less length than said notches whereby said ends may slide relatively to each other.

NORMAN B. BRALY.